United States Patent [19]

Muto

[11] Patent Number: 4,758,404
[45] Date of Patent: Jul. 19, 1988

[54] METHOD OF PRODUCING COMPOSITE MATERIAL FOR SLIDING MEMBER

[75] Inventor: Takashi Muto, Nagoya, Japan
[73] Assignee: Daido Metal Company, Ltd., Nagoya, Japan
[21] Appl. No.: 921,062
[22] Filed: Oct. 21, 1986

[30] Foreign Application Priority Data

Nov. 18, 1985 [JP] Japan .................. 60-256618

[51] Int. Cl.$^4$ .............................................. B22F 5/00
[52] U.S. Cl. ........................................ 419/3; 419/8; 419/11; 419/31; 419/43; 419/57; 419/69; 264/25; 264/125; 264/555
[58] Field of Search .................. 419/8, 22, 31, 25, 26, 419/43, 56, 3, 11, 52, 69; 264/125, 25, 555

[56] References Cited

U.S. PATENT DOCUMENTS

| | | | |
|---|---|---|---|
| 4,048,705 | 9/1977 | Blanpain et al. | 419/61 |
| 4,190,440 | 2/1980 | Klein et al. | 419/31 |
| 4,491,559 | 1/1985 | Grab et al. | 419/36 |
| 4,640,711 | 2/1987 | Lichti et al. | 419/31 X |

FOREIGN PATENT DOCUMENTS

| | | |
|---|---|---|
| 2071703 | 10/1981 | United Kingdom . |
| 2090873 | 4/1982 | United Kingdom . |
| 2157600 | 7/1985 | United Kingdom . |

Primary Examiner—Peter A. Nelson
Attorney, Agent, or Firm—Browdy and Neimark

[57] ABSTRACT

In a method of producing a composite material for a sliding member having a sliding portion and a backing material which supports the sliding portion, the method comprises the steps of: disposing a powder or a sheet material for the sliding portion on the backing material; irradiating the powder or sheet material with laser beam or electron beam; melting or partially melting the beam-irradiated powder or sheet material; and quenching and solidifying the melted or partially melted portion, whereby the particles of the powder are integrated with one another and the powder in contact with the backing material are bonded thereto, or whereby the sheet material in contact wiht the backing material are bonded thereto.

17 Claims, 2 Drawing Sheets

METHOD OF PRODUCING COMPOSITE MATERIAL FOR SLIDING MEMBER

BACKGROUND OF THE INVENTION

The present invention relates to a method of producing a composite material for a sliding member by using a laser beam or electron beam.

As a technique of producing a material by using a laser beam, the specification of Japanese Patent Examined Publication No. 48921/1984 (or Japanese Patent Unexamined Publication No. 97911/1978) discloses a technique in which an irradiation by a laser beam is applied to a sintered alloy, and the surface layer of the sintered alloy is thereby modified so as to improve the corrosion resistance of the alloy. Furthermore, Japanese Patent Unexamined Publication No. 59020/1985 discloses a technique in which an irradiation by a laser beam is applied to the surface layer of bearing metal produced by a conventional bearing production method, in order to improve the durability of the bearing.

In the above-described prior-art techniques, the laser beams are used to improve characteristics, in such a way that an irradiation by a laser beam is applied to a sintered alloy or bearing metal for bearings having been already obtained by a conventional production technique. However, since the sintered alloy or bearing metal per se is produced by a conventional production technique, it is necessary to use conventional production equipment to provide this alloy or metal layer, with the result that the prior art has a disadvantage in that the cost of production of a composite material by subsequent use of laser beam becomes high. Another disadvantage of the prior art is that, since only the surface layer is modified by use of laser beam to ensure that the surface layer can be adapted for use as a sliding member, the bonding strength between the surface layer and a backing material and the durability of the resultant composite material product are apt to be lowered.

SUMMARY OF THE INVENTION

It is an object of the present invention to provide a method of producing a composite material for a sliding member which is free from the above-described conventional problems, by the use of a laser beam or electron beam during the production of a sliding article adapted for use as various types of bearing material.

The present invention provides a continuous method of producing a composite material for a sliding member which has a sliding portion and a backing material which supports the sliding portion, the improvement comprising the steps of:

continuously disposing a powder or a sheet material for the sliding portion on the moving backing material;

irradiating the powder or sheet material disposed on the backing material with a laser beam or electron beam so as to melt or partially melt the powder or sheet material; and quenching and solidifying the melted or partially melted portion so that the particles of the powder are integrated with one another and the powder in contact with the backing material becomes bonded thereto, or so that the sheet material in contact with the backing material becomes bonded thereto.

In the method of this invention, prior to the irradiation with the laser or electron beam, any one of the following three pre-treatments may be selectively effected: pre-rolling of the powder on the backing material; preheating of the powder so that it is maintained at a predetermined temperature; or preheating followed by pre-rolling.

The above and other objects, features and advantages of the present invention will become apparent from the following description of the preferred embodiments thereof, taken in conjunction with the accompanying drawings.

DESCRIPTION OF THE PREFERRED EMBODIMENTS

Preferred embodiments of the present invention will be described hereinbelow, with reference to several specific examples. No vibration is depicted in the figures or mentioned in the examples.

EXAMPLE 1

Figure 1:
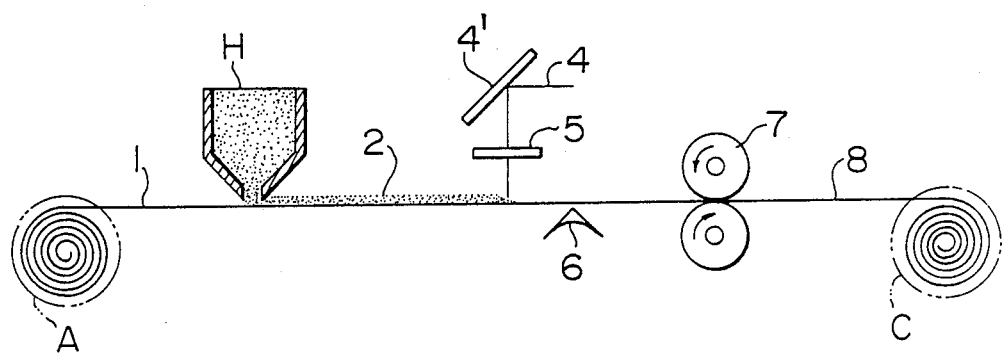
FIG. 1 is a schematic view of the general construction of a plant showing a first preferred embodiment of a method of producing a composite material for a sliding member in accordance with the present invention.

FIG. 1 is a schematic view of the general construction of a plant showing a first preferred embodiment of a method of producing a composite material for a sliding member in accordance with the present invention. In FIG. 1, a reference numeral 1 is a backing material which is wound as a coil (a steel strip of a low-carbon steel such as, for example, JIS G3141 SPCE), A being an uncoiler for uncoiling the backing material 1, H being means for disposing powder used for a sliding portion onto the backing material 1, 4 being a laser beam generated by a carbon dioxide laser (not shown), 4' being a laser-beam-reflecting mirror, 5 being a laser-beam condenser lens, 6 being a cooling device spaced about 5 cm apart from the position of laser beam irradiation, 7 being sizing pressure rolls, 8 being a composite material used for a sliding member, and C being a coiler for winding up the composite material 8.

Figure 5:
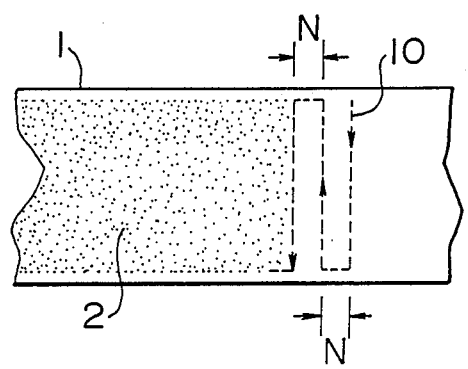
FIG. 5 is a drawing showing a route of laser beam applied onto alloy powder disposed on a backing material.

The backing material 1 was unwound by the uncoiler A, and each of two kinds of powder 2 (one containing 23% Pb, 3% Sn, the remainder being Cu, and the other containing 10% Pb, 10% Sn, the remainder being Cu) was disposed onto different samples of the uncoiled backing material 1 by the powder disposing means H, so that a powder layer of a thickness of 0.5 to 2.0 mm was formed on the material 1. The irradiation of laser beam 4 was applied onto the thus-disposed alloy powder 2 by the carbon dioxide laser (not shown), the route M of which laser beam is shown in FIG. 5. The conditions of the laser beam were such that the power output of the laser was 1.5 kW, the speed of travel of the beam was 0.5 m/min, the beam width was 8 mm, and a pitch (N) in a longitudinal direction of the laser beam was 8 mm as shown in FIG. 8. Shortly after this laser-beam irradiation, Ar or $N_2$ gas having a flow rate of 20 l/min was jetted by the cooling device 6 onto the alloy powder 2, whose particles had bonded together, so as to quench and solidify the integrated particles while preventing the oxidization thereof, thereby forming a sliding portion. The sliding portion was worked into a sliding composite material having a sliding portion density of 90–97% regarding ideal density and a thickness of 1.5 to 3.5 mm by the sizing rolls 7, and the thus-obtained composite material was wound up by the coiler C. It was confirmed from the result of experiments on samples that the particles of each of the alloy powders 2 were integrated together on the sliding portion of each piece of the backing material 1, and that the sliding portion adjacent to the backing material 1 was sufficiently strongly bonded to the backing material 1. Table 1 shows the characteristics of these samples.

EXAMPLE 2

Figure 2:
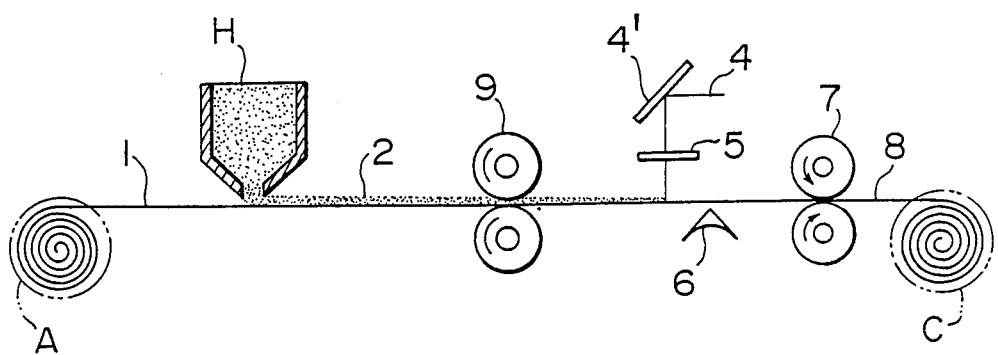
FIG. 2 is a schematic view of the general construction of a plant showing a second preferred embodiment of a method of producing a composite material for a sliding member in accordance with the present invention.

FIG. 2 is a schematic view of the general construction of a plant incorporating a second preferred embodiment of a method of producing a composite material for a sliding member in accordance with the present invention. In FIG. 2, the backing material 1, kinds of alloy powder 2, and the laser-beam apparatus used in the second embodiment were the same as those of the first embodiment. Example 2 differs from Example 1 in that, after each of the two kinds of alloy powder 2 was disposed onto a backing material 1, the disposed alloy powder 2 was compacted by pressure rolls 9, before being irradiated with the laser beam, so that the alloy powder layer was compacted within a range of 0.3 to 1.5 mm in thickness and that the obtained compact was made to partially adhere to the backing material 1. The conditions of the laser beam were such that the power output of the laser was 1.5 kW, the speed of travel of the beam was 0.5 m/min, and the beam width was 8 mm. The route of the irradiation laser beam was in the same manner as in FIG. 5. The experimental results of Example 2 were as good as those of Example 2. Table 2 shows the characteristics of these samples.

EXAMPLE 3

Figure 3:
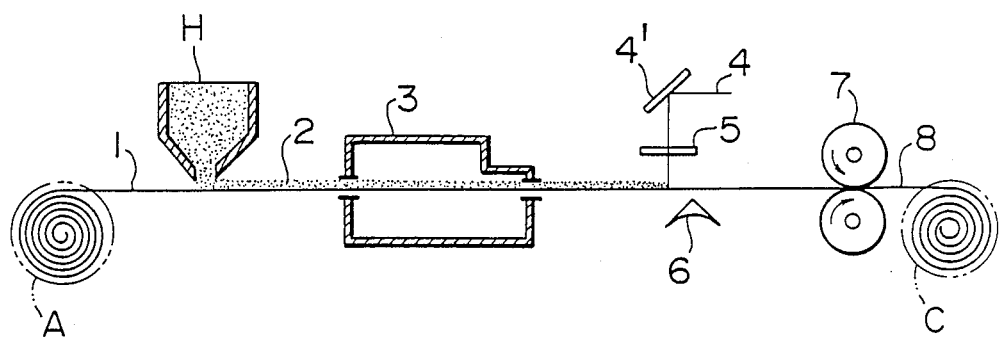
FIG. 3 is a schematic view of the general construction of a plant showing a third preferred embodiment of a method of producing a composite material for a sliding member in accordance with the present invention.

FIG. 3 is a schematic view of the general construction of a plant showing a third preferred embodiment of a method of producing a composite material for a sliding member in accordance with the present invention. The backing material 1, kinds of the alloy powder 2, and the laser-beam apparatus used in the third embodiment were the same as those of the first embodiment.

Example 3 differs from Example 1 in that, after each of the two kinds of alloy powders 2 was disposed onto the backing material 1, the alloy powder 2 thus disposed was preheated by a heater 3 before being irradiated with the laser beam, so that the particles of the alloy powder 2 were preliminarily integrated together and the alloy powder 2 were made to preliminarily adhere to the backing material 1. The alloy powder 2 was preheated to a temperature of 750° to 830° C. for 3 to 5 minutes within the heater 3 which had a reducing gaseous atmosphere consisting of 25% $H_2$ and the remainder $N_2$. The conditions of the laser beam were such that the power output of the laser was 1.5 kW, the speed of travel of the beams was 0.5 m/min, and the beam width was 8 mm. The route of the irradiation laser beam was in the same manner as in FIG. 5. The experimental results of Example 3 were as good as those of Example 1. Table 3 shows the characteristics of these samples.

EXAMPLE 4

Figure 4:
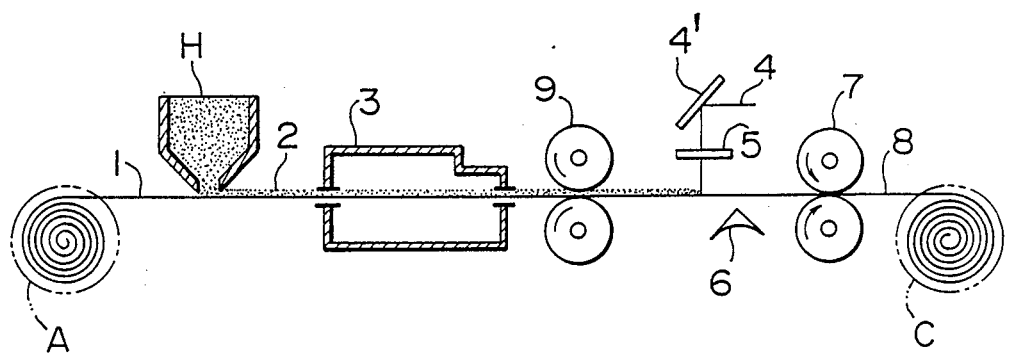
FIG. 4 is a schematic view of the general construction of a plant showing a fourth preferred embodiment of a method of producing a composite material for a sliding member in accordance with the present invention.

FIG. 4 is a schematic view of the general construction of a plant showing a fourth preferred embodiment of a method of producing a composite material for a sliding member in accordance with the present invention. The backing material 1, kinds of alloy 2 powder, and the laser-beam apparatus used in the fourth embodiment were the same as those of the first embodiment.

Example 4 differs from Example 1 in that, after each of the alloy powders 2 was disposed onto the backing material, the alloy powder 2 thus disposed was preliminarily heated and compacted by the heater 3 and the compacting rolls 9, respectively, before being irradiated with the laser beam. The preheating was carried out in the same atmosphere and under the same treatment conditions as those of Example 3. In Example 4, the preheated alloy powder 2 was further compressed by the compacting rolls 9, so that the alloy powder 2 was compacted to a thickness of 0.3 to 1.5 mm. The conditions of the laser beam were such that the power output of the laser was 1.5 kW, the speed of travel of the beam was 0.5 m/min, and the beam width was 8 mm. The route of the laser beam was in the same manner as in FIG. 5. The experimental results of Example 4 were as good as those of Example 1. Table 4 shows the characteristics of these samples.

In Examples 3 and 4, preheating was carried out in order to adjust the cooling speed by controlling the temperature gradient which occurred between the preheating temperature and the melting temperature achieved by the laser-beam irradiation. In addition, pre-rolling was carried out in order to make the alloy powder 2 as compact as possible so as to improve the thermal efficiency with which the thus-compacted powder 2 was melted by the irradiation of the laser beam. Incidentally, in the above-described Examples 1 to 4, although a low-carbon steel (or steel strip) was used as the backing material 1, this type of steel may be replaced with a nonferrous material. In addition, while two kinds of copper-based alloy powder were used as the alloy powder 2, they may be replaced by an aluminium-based alloy powder. A sheet material may be employed instead of such a powder, and the sheet material preferably may have a composition corresponding to that of one of the powders 2 shown in Examples 1 to 4. This sheet material may be made of cast articles, articles made of compacted powder, heat-treated compacted-power articles, or other known sheet material obtained from a process in which such a material is rolled to a desired thickness. The thickness of each of these sheet materials may be in the same degree of magnitude as the powder layer prepared in Examples 1 to 4. In addition, while Examples 1 to 4 use a laser beam, an electron beam may be employed instead of the laser beam. It has been confirmed that any of the above-described options is capable of providing the same effects and advantages as those of Examples 1 to 4.

In the method of producing a composite material for a sliding member in accordance with the present invention, means which is arranged in such a manner that an irradiation of a laser or electron beam is applied onto an alloy powder or sheet material is adopted as means for bonding an alloy powder and a backing material together and for integrating the particles of the alloy powder with one another. The following effects are obtained thereby:

(A) Since the irradiation of the laser or electron beam causes localized intensive melting of the alloy powder or sheet material and the locally-melted portion is quenched and solidified by a cooling device, it is possible to obtain a cast structure which is strong and homogenous and which has no defects such as cavities, or a structure of a similar quality.

(B) Since the size of the casting equipment can be reduced to less than that of the prior-art production method, the working environment and atmosphere are not adversely affected.

(C) The thermal effeciency is improved and the amount of energy used is reduced.

(D) In the prior art, insufficient pressure at the opposite ends of each pressure roller results in the formation of a defective portion over a range of several millimeters to several centimeters from the edges of the composite material. However, in the method of this invention, such a defective portion is not created.

(E) The working efficiency can be made constant, irrespectively of the thickness of the backing material.

(F) Although prior-art continuous casting techniques require a gate to prevent the leakage of the melted alloy, the present invention requires no gate, so that it is possible to prevent the formation of any defective portions relating to the gate.

TABLE 1

| Alloy Compositions of Sliding Portion | Properties | | |
|---|---|---|---|
| | Tensile Strength of Sliding Portion (kgf/mm$^2$) | Hardness of Sliding Portion Hv (10) | Hardness of Backing Material Hv (10) |
| 23% Pb - 3% Sn - Bal.Cu (LS23 Alloy) | 12.0 | 97.9 | 123.0 |
| 10% Pb - 10% Sn - Bal.Cu (LS10 Alloy) | 19.9 | 77.5 | 118.2 |

TABLE 2

| Alloy Compositions of Sliding Portion | Properties | | |
|---|---|---|---|
| | Tensile Strength of Sliding Portion (kgf/mm$^2$) | Hardness of Sliding Portion Hv (10) | Hardness of Backing Material Hv (10) |
| 23% Pb - 3% Sn - Bal.Cu (LS23 Alloy) | 20.5 | 73.3 | 131.0 |
| 10% Pb - 10% Sn - Bal.Cu (LS10 Alloy) | 25.6 | 109.2 | 125.3 |

TABLE 3

| Alloy Compositions of Sliding Portion | Properties | | |
|---|---|---|---|
| | Tensile Strength of Sliding Portion (kgf/mm$^2$) | Hardness of Sliding Portion Hv (10) | Hardness of Backing Material Hv (10) |
| 23% Pb - 3% Sn - Bal.Cu (LS23 Alloy) | 27.4 | 72.2 | 131.3 |
| 10% Pb - 10% Sn - Bal.Cu (LS10 Alloy) | 32.6 | 85.5 | 137.3 |

TABLE 4

| Alloy Compositions of Sliding Portion | Properties | | |
|---|---|---|---|
| | Tensile Strength of Sliding Portion (kgf/mm$^2$) | Hardness of Sliding Portion Hv (10) | Hardness of Backing Material Hv (10) |
| 23% Pb - 3% Sn - Bal.Cu (LS23 Alloy) | 21.2 | 67.6 | 136.2 |
| 10% Pb - 10% Sn - Bal.Cu (LS10 Alloy) | 28.9 | 103.0 | 132.0 |

What is claimed is:

1. A continuous method of producing a composite material for a sliding member having a sliding portion and a backing material which supports said sliding portion, said method comprising the steps of:
   disposing a powder or a sheet material for said sliding portion on said backing material;
   irradiating said powder or sheet material disposed on said backing material with laser beam or electron beam;
   melting or partially melting said beam-irradiated portion of said powder or sheet material; and
   quenching and solidifying said melted or partially melted portion so that the particles of said powder are integrated with one another and said powder in contact with said backing material is bonded thereto, or so that said sheet material in contact with said backing material is bonded thereto.

2. A method according to claim 1, wherein said backing material is a steel strip made of a low-carbon steel and said powder or sheet material for said sliding portion is a powdered Cu-based or Al-based alloy containing Pb and Sn.

3. A method according to claim 1, wherein the thickness of said powder disposed on said backing material ranges from 0.5 to 2.0 mm, and the thickness of the produced composite material is in the range of 1.5 to 3.5 mm.

4. A method according to claim 1, wherein said melted and partially melted portion is quenched and solidified by jetting Ar or N$_2$ gas onto said portion.

5. A method of producing a composite material for a sliding member having a sliding portion and a backing material which supports said sliding portion, said method comprising the steps of:
   disposing a powder for said sliding portion on said backing material;
   prerolling said powder disposed on said backing material;
   irradiating said prerolled powder disposed on said backing material with laser or electron beam;
   melting or partially melting said beam-irradiated portion of said powder or sheet material; and
   quenching and solidifying said fused or semifused portion so that the particles of said powder are integrated with one another and said powder in contact with said backing material is bonded thereto.

6. A method according to claim 5, wherein said backing material is a steel strip made of a low-carbon steel and said powder for said sliding portion is made of a Cu-based or Al-based alloy containing Pb and Sn.

7. A method according to claim 6, wherein the thickness of said powder disposed on said backing material is 0.5 to 2.0 mm and the thickness of the produced composite material is within a range of 1.5 to 3.5 mm.

8. A method according to claim 5, wherein said melted and partially melted portion is quenched and solidified by jetting Ar or $N_2$ gas onto said portion.

9. A method of producing a composite material for a sliding member having a sliding portion and a backing material which supports said sliding portion, said method comprising the steps of:
 disposing a powder for said sliding portion on said backing material;
 preheating said powder disposed on said backing material to a predetermined temperature;
 irradiating said preheated powder with laser beam or electron beam;
 melting or partially melting said beam-irradiated portion of said powder; and
 quenching and solidifying said melted or partially melted portion so that the particles of said powder are integrated with one another and so that said powder in contact with said backing material are bonded thereto.

10. A method according to claim 9, wherein said backing material is a low-carbon steel and said powder for said sliding portion is a powdered Cu-based or Al-based alloy containing Pb and Sn.

11. A method according to claim 9, wherein the thickness of said powder disposed on said backing material is 0.5 to 2.0 mm, and the thickness of the produced composite material is in a range of 1.5 to 3.5 mm.

12. A method according to claim 9, wherein said melted and partially melted portion is quenched and solidified by jetting Ar or $N_2$ gas onto said portion.

13. A method of producing a composite material for a sliding member having a sliding portion and a backing material which supports said sliding portion, said method comprising the steps of:
 disposing a powder for said sliding member on said backing material;
 preheating said powder disposed on said backing material to a predetermined temperature;
 prerolling said preheated powder;
 irradiating said preheated and prerolled powder with laser beam or electron beam;
 melting or partially melting said beamirradiated portion of said powder; and
 quenching and solidifying said melted or partially melted portion so that the particles of said powder are integrated with one another and so that said power in contact with said backing material are bonded thereto.

14. A method according to claim 13, wherein said backing material is a steel strip made of a low-carbon steel and said powder for said sliding portion is a powdered Cu-based or Al-based alloy containing Pb and Cu.

15. A method according to claim 13, wherein the thickness of said powder spread on said backing material is 0.5 to 2 mm and the thickness of the produced composite material is in the range of 1.5 to 3.5 mm.

16. A method according to claim 13, wherein said melted or partially melted portion of said powder is quenched and solidified by jetting Ar or $N_2$ gas onto said portion.

17. A continuous method according to claim 1 effected in the absence of vibration, wherein said powder is continuously disposed on a continuous strip of said backing material while said backing material is continuously moved past a depositing zone.

* * * * *